US012800394B2

(12) United States Patent
Fissore

(10) Patent No.: US 12,800,394 B2
(45) Date of Patent: Nov. 17, 2026

(54) METASURFACE BASED FULL STOKES POLARIMETRIC CAMERA WITH SINGLE APERTURE STOP

(71) Applicant: STMicroelectronics International N.V., Geneva (CH)

(72) Inventor: Matteo Fissore, Edinburgh (GB)

(73) Assignee: STMicroelectronics International N.V., Geneva (CH)

( * ) Notice: Subject to any disclaimer, the term of this patent is extended or adjusted under 35 U.S.C. 154(b) by 309 days.

(21) Appl. No.: 18/613,428

(22) Filed: Mar. 22, 2024

(65) Prior Publication Data

US 2025/0297894 A1 Sep. 25, 2025

(51) Int. Cl.

| | |
|---|---|
| ***G01J 3/00*** | (2006.01) |
| ***B82Y 20/00*** | (2011.01) |
| ***G01J 3/28*** | (2006.01) |
| ***G01J 3/447*** | (2006.01) |
| ***G01J 4/04*** | (2006.01) |
| ***G02B 1/00*** | (2006.01) |
| ***H04N 23/81*** | (2023.01) |

(52) U.S. Cl.

CPC ................. *G01J 4/04* (2013.01); *B82Y 20/00* (2013.01); *G01J 3/2803* (2013.01); *G01J 3/447* (2013.01); *G02B 1/002* (2013.01); *H04N 23/81* (2023.01); *G02B 2207/101* (2013.01)

(58) Field of Classification Search

CPC . G01J 3/2803; G01J 3/447; G01J 4/04; G02B 1/002; G02B 2207/101; B82Y 20/00

See application file for complete search history.

(56) References Cited

U.S. PATENT DOCUMENTS

| | | | | |
|---|---|---|---|---|
| 2022/0214219 | A1* | 7/2022 | Faraon | G01J 3/0229 |
| 2022/0268632 | A1* | 8/2022 | Liang | G01J 3/51 |
| 2023/0314827 | A1 | 10/2023 | Devlin et al. | |

FOREIGN PATENT DOCUMENTS

| | | | |
|---|---|---|---|
| CN | 114791670 | B | 10/2023 |
| WO | 2016178740 | A2 | 11/2016 |
| WO | 2018118984 | A1 | 6/2018 |
| WO | 2020214615 | A1 | 10/2020 |
| WO | 2022146543 | A2 | 7/2022 |
| WO | 2023004143 | A1 | 1/2023 |

OTHER PUBLICATIONS

Arbabi, Ehsan, et al.: "Full Stokes Imaging Polarimetry Using Dielectric Metasurfaces," arXiv: 1803.03384v1 [physics.optics], Mar. 9, 2018, 20 pgs.

Rubin, Noah A., et al.: "Polarization State Generation and Measurement With a Single Metasurface," Optics Express, vol. 26, Issue 17, 2018, 18 pgs.

Metalenz: "PolarEyes Polarization Imaging System," see web graphics, Copyright 2024.

* cited by examiner

*Primary Examiner* — Dani Fox

(74) *Attorney, Agent, or Firm* — Crowe & Dunlevy LLC

(57) ABSTRACT

Disclosed herein is a polarimetric camera, including an aperture stop configured to permit entry of incoming light, a single photosensor array arranged to capture images, and a metasurface element positioned between the aperture stop and the photosensor array. The metasurface element includes an interleaved arrangement of cells designed to split the incoming light into multiple polarized images for simultaneous capture by the single photosensor, each polarized image corresponding to a distinct fundamental polarization state.

22 Claims, 6 Drawing Sheets

METASURFACE BASED FULL STOKES POLARIMETRIC CAMERA WITH SINGLE APERTURE STOP

TECHNICAL FIELD

This disclosure is directed to the field of optical imaging and, in particular, to the use of a metasurface to create a full stokes polarimetric camera with a single aperture stop.

BACKGROUND

Polarization refers to the orientation of the electric field vector of light waves and can reveal important properties about the light source and the medium through which the light has traveled. Therefore, the measurement of light polarization is of interest in various fields, for example for the production of a camera which measures the polarization state of the light across an entire scene.

To analyze the polarization of light, a polarization analyzer may be employed, which can be a linear polarizer, polarization beam splitter, or a similar device, designed to separate light into components based on the direction of oscillation of its electric fields. By measuring these components, the full Stokes vector of the light can be computed.

The Stokes vector is composed of four elements that together provide a complete representation of the polarization state of the light: the total intensity (I), the difference in intensity between the horizontal and vertical polarization components (Q), the difference between the two diagonal polarization components (U), and the difference between the right- and left-circular polarization components (V). The Stokes vector, once computed, enables a quantitative assessment of all the polarization characteristics of light.

Various approaches have been used to develop effective polarization analyzers and polarimetric cameras. For example, one known technique involves the use of multiple cameras arranged side by side. Each camera in this configuration includes a distinct polarizing element, which may include linear polarizers, polarization beam splitters, or waveplates. While this arrangement allows for comprehensive polarization analysis, it is not without drawbacks, with its primary limitations including the increased cost and volume associated with the use of multiple cameras. Additionally, this setup can lead to parallax issues, a result of the physical separation between the cameras, which can affect the accuracy of polarization measurements.

Another known technique involves the deployment of multiple cameras in conjunction with sequential polarization beam splitters. This shares some of the disadvantages of the side-by-side camera arrangement, namely the high cost and significant volume occupancy. Moreover, the field of view in this configuration is inherently restricted. Overcoming this limitation requires either the use of large beam splitter elements or the incorporation of a scanning system, both of which can further increase the complexity and cost of the system.

Yet another known technique relies on mechanically rotating polarizers and/or waveplates integrated in a single camera, where measurements are performed sequentially with different orientations of the optical polarizing elements, and the Stokes vector reconstructed by considering the total set of measurements. While this technique overcomes some difficulties identified above, namely it employs a single sensor and imaging lens, and is not restricted in field of view, it requires moveable or otherwise variable polarizing elements, which add complexity, bulk and cost to the system, and prevent effective miniaturization of the system.

A more recent approach in polarimetric imaging technology is the integration of polarizing elements directly onto the individual pixels of an imaging sensor. This solution, in theory, effectively transforms any standard camera into a polarimetric one. However, this approach is not without its challenges. The addition of polarizing elements at the pixel level introduces both increased manufacturing costs and complexity. Furthermore, there are technical difficulties associated with fabricating certain types of polarizing elements, particularly those required for circular polarization, which can limit the effectiveness of this approach in certain applications; this latter limitation, makes the realization of full-Stokes measurements particularly challenging, and these types of systems are often confined to two- or three-Stokes parameter measurements.

Each of these methods addresses certain challenges in the field of polarization analysis, yet they also serve to highlight the ongoing challenges and trade-offs faced thus far in the development of polarimetric imaging systems. Further development is therefore needed, particularly in the creation of a compact, cost-effective solution that can be incorporated into consumer devices.

SUMMARY

Disclosed herein is a polarimetric camera, including an aperture stop configured to permit entry of incoming light from a scene, a single photosensor array arranged to capture images, and a metasurface element positioned between the aperture stop and the photosensor array, with the metasurface element including an interleaved arrangement of cells designed to split the incoming light into multiple polarized images, each polarized image corresponding to a distinct fundamental polarization state.

The interleaved arrangement of cells of the metasurface element may include first, second, and third sets of cells.

The first set of cells may be configured to separate the incoming light into vertically and horizontally polarized light, the second set of cells may be configured to separate the incoming light into clockwise and counterclockwise polarized light, and the third set of cells may be configured to separate the incoming light into diagonally and antidiagonally polarized light.

The first, second, and third sets of cells may be configured to separate the incoming light into three distinct pairs of polarization states of light, such that within each pair the polarization states are mutually orthogonal.

The first, second, and third sets of cells may be arranged in a hexagonally interleaved pattern, or may be arranged in an irregularly interleaved pattern.

The interleaved arrangement of the cells may be configured to project the polarized images onto corresponding regions of the photosensor array, and circuitry may be configured to reconstruct a full Stokes vector for each pixel of the captured images.

Each of the first, second, and third sets of cells may be configured to flip the orientation of polarization across a central axis of the metasurface element so that the first set of cells separates the incoming light into vertically and horizontally polarized light, so that the second set of cells separates the incoming light into clockwise and counterclockwise polarized light, and so that the third set of cells separates the incoming light into diagonally and antidiagonally polarized light.

Each of the first, second, and third sets of cells may be configured to flip the orientation of polarization across a central axis of the metasurface element so that the first set of cells separates the incoming light into a first orthogonal pair of light polarization states, so that the second set of cells separates the incoming light into a second orthogonal pair of light polarization states, and so that the third set of cells separates the incoming light into a third orthogonal pair of light polarization states.

A processing circuit configured to process the captured images by mapping pixels from each polarized image to corresponding counterparts in other polarized images, and then reconstructing a full Stokes vector for each pixel of the captured images from the polarized images. The processing circuit may be further configured to correct fixed distortion resulting from the single aperture stop, thereby producing an undistorted final output image. In addition, the processing circuit may reconstruct a three dimensional image of the scene from the full Stokes vector for each pixel of the captured images.

Also disclosed herein is a method for capturing polarized images using a polarimetric camera. The method includes permitting entry of incoming light through an aperture stop, directing the incoming light onto a metasurface element positioned between the aperture stop and a single photosensor, splitting the incoming light into multiple polarized images using an interleaved arrangement of cells within the metasurface element, wherein each polarized image corresponds to a distinct fundamental polarization state, and capturing the multiple polarized images using the single photosensor.

Splitting the incoming light may include manipulating the phase and amplitude of the incident light via subwavelength nanostructures of the cells in the metasurface element to produce images corresponding to vertical-horizontal polarization, clockwise-counterclockwise polarization, and diagonal-antidiagonal polarization.

Splitting the incoming light may include manipulating the phase and amplitude of the incident light via subwavelength nanostructures of the cells in the metasurface element to produce images corresponding to three distinct polarization pairs.

The incoming light may be split into vertically and horizontally polarized light using a first set of cells of the metasurface element, clockwise and counterclockwise polarized light using a second set of cells of the metasurface element, and diagonally and antidiagonally polarized light using a third set of cells of the metasurface element.

The first, second, and third sets of cells may be arranged in a hexagonally interleaved pattern within the metasurface element, or may be arranged in an irregularly interleaved pattern within the metasurface element.

The orientation of polarization may be flipped across a central axis of the metasurface element by each of the first, second, and third sets of cells.

The interleaved pattern of cells may be configured to project the polarized images onto corresponding regions of the photosensor, and a full Stokes vector may be reconstructed for each pixel of the captured images.

Also disclosed herein is a metasurface element formed by an interleaved arrangement of cells, the interleaved arrangement of cells including a first set of cells configured to separate incoming light from a scene into vertically and horizontally polarized light, a second set of cells configured to separate the incoming light into clockwise and counterclockwise polarized light, and a third set of cells configured to separate the incoming light into diagonally and antidiagonally polarized light.

This metasurface element may be within a camera apparatus that also includes a photosensor array arranged with respect to the metasurface element so that the vertically and horizontally polarized light is projected onto corresponding first and second regions of the photosensor array, the clockwise and counterclockwise polarized light is projected onto corresponding third and fourth regions of the photosensor array, and the diagonally and antidiagonally polarized light is projected onto corresponding fifth and sixth regions of the photosensor array, such that the photosensor array captures a single image comprised of first, second, third, fourth, fifth, and sixth sub-images at the corresponding first, second, third, fourth, fifth, and sixth regions of the photosensor array. The camera apparatus may further include an application specific integrated circuit (ASIC) configured to compare relative intensity of different pixels of the single image by mapping pixels from each of the first, second, third, fourth, fifth, and sixth sub-images to their corresponding counterparts in others of the first, second, third, fourth, fifth, and sixth sub-images to thereby reconstruct a full Stokes vector for each pixel of the single image.

The ASIC may reconstruct a three dimensional image of the scene from the full Stokes vector for each pixel of the single image.

DETAILED DESCRIPTION

The following disclosure enables a person skilled in the art to make and use the subject matter described herein. The general principles outlined in this disclosure can be applied to embodiments and applications other than those detailed above without departing from the spirit and scope of this disclosure. It is not intended to limit this disclosure to the embodiments shown, but to accord it the widest scope consistent with the principles and features disclosed or suggested herein.

Figure 1:
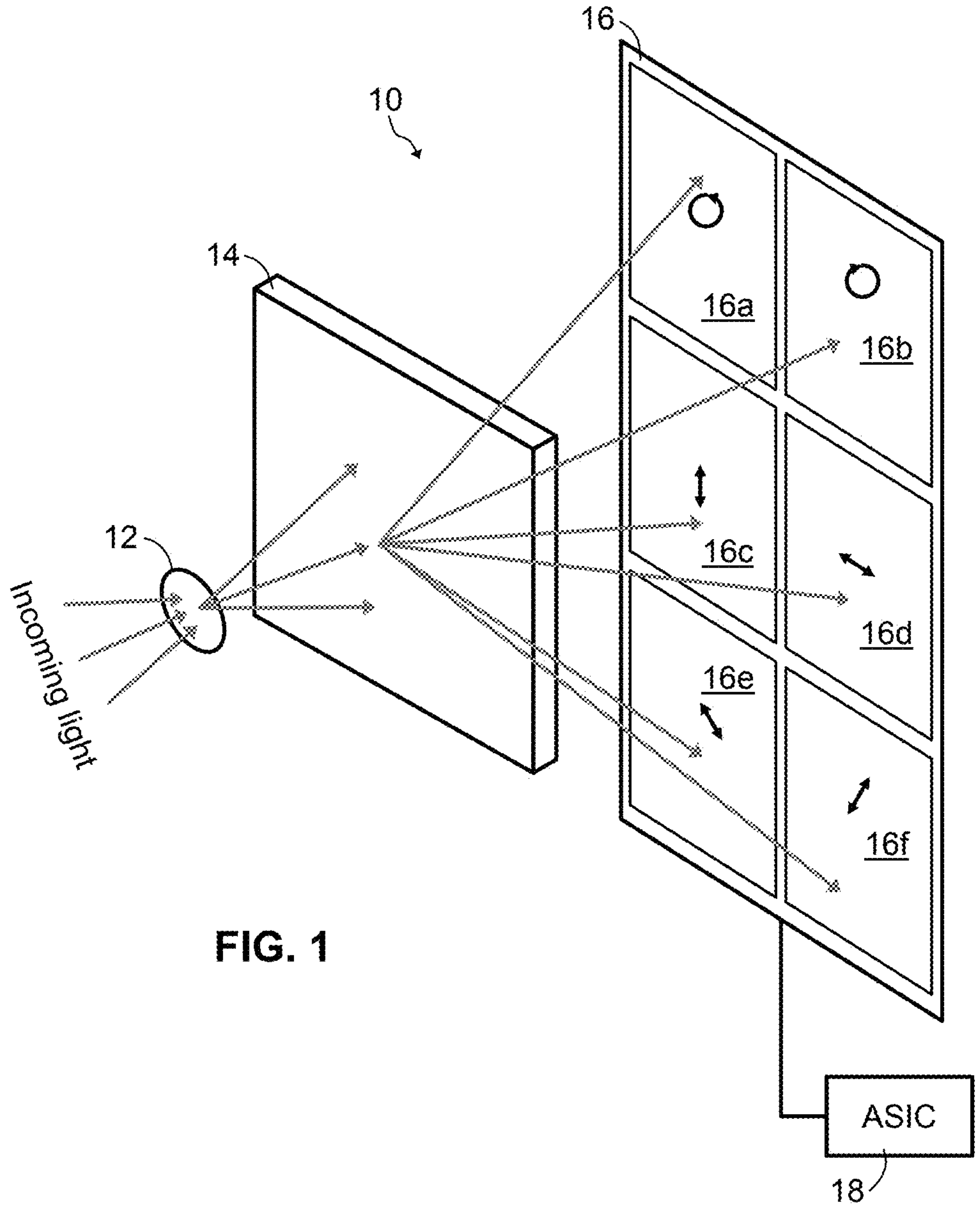
FIG. 1 is a diagrammatical representation of a polarimetric camera disclosed herein.

A polarimetric camera 10 disclosed herein is now described with reference to FIG. 1. The polarimetric camera 10 includes a housing (not shown) including an aperture into which an aperture stop 12 is integrated. The aperture stop 12 serves as the entry point for incoming light, for example ranging light reflecting off a target in the scene. The incoming light, after entering through aperture stop 12, impinges upon a metasurface 14 that focuses the incoming light and splits the incoming light into six distinct polarized images 16*a*-16*f* of the same scene from which the incoming light originated, each image 16*a*-16*f* being an independent and accurate representation of the observed scene. These images correspond to three pairwise polarization state measurements of the incoming light, such that the polarization components in each pair are orthogonal to each other in the electromagnetic sense. An example of such set of three pairs is as follows: counterclockwise polarized 16*a*, clockwise polarized 16*b*, vertical polarized 16*c*, horizontal polarized 16*d*, antidiagonally polarized 16*e*, and diagonally polarized 16*f*. In the example above, purely horizontally polarized incoming light will form an image of the scene with high intensity in sector 16*d*, while the metasurface 14 will direct little to no light to sector 16*c*. Furthermore, due to the properties of light polarization, images of equal intensities will be formed in sectors 16*a* and 16*b*, and 16*e* and 16*f*. Similarly, purely vertically polarized incoming light will form a high intensity image in sector 16*c*, and little to no light will fall in sector 16*d*. Conversely, totally unpolarized light, commonly known as natural or thermal light, will form six images of approximately equal intensities in sectors 16*a* to *f*. Similar considerations apply to any incident polarization state, where the metasurface element 14 will effectively perform a projection of the polarization state of each point of the scene onto the six polarization states as previously defined.

These polarized images 16*a*-16*f* are projected onto a single photosensor 16 (e.g., a single photosensing array comprised of X rows and Y columns), which captures all six images simultaneously. The single image captured by the photosensor 16, comprised of the six polarized images 16*a*-16*f* as shown in FIG. 1, is processed by an Application Specific Integrated Circuit (ASIC) 18 or other suitable digital processor. By comparing the relative intensity at corresponding related pixels of the single photosensor 16 onto which the polarized images 16*a*-16*f* are projected, the full Stokes vector for each incident direction can be reconstructed by the ASIC 18. This includes the reconstruction of the degree of (de) polarization. If the incident light is totally unpolarized, such as the light emitted by an incandescent source, all six images 16*a*-16*f* will have an equal intensity.

Note that the images 16*a*-16*f* suffer from a degree of distortion, due to the usage of a single aperture stop and single imaging element. However, this amount of distortion is completely determined by the design and construction of the imaging element 14 and its relative positioning to the aperture 12 and sensor 16. Knowledge of these parameters allows to define in advance a mathematical transformation of the image (often known as image warping), such that the distortion is digitally fixed and corrected by the ASIC 18 and an undistorted representation of the scene is obtained for all six images 16*a*-16*f*. The ASIC 18 then maps the digitally different pixels from each undistorted image 16*a*-16*f* to their corresponding counterparts in each other image 16*a*-16*f*. The result of this is an undistorted representation of the scene as a final output image, with each pixel in the final output image embodying a Stokes vector rather than the conventional RGB color values found in standard cameras. The first parameter of the Stokes vector, (I), represents the total intensity of the light, akin to a grayscale image where each pixel value denotes the brightness of the light. The other components of the Stokes vector, namely (Q), (U), and (V) articulate the polarization state of the light, detailing the intensity differences along different planes and axes of polarization. The integration of these parameters allows the camera to capture a full representation of the light's polarization characteristics at every pixel. While the Stokes vector does not directly provide color information in the traditional sense, the total intensity (I) can be analogous to a luminance channel in color imaging, and when desired, color filters could be used in conjunction with the polarimetric sensors to capture both polarization and color information.

Metasurfaces, such as metasurface 14 employed in the polarimetric camera 10, enable precise control over light waves. Metasurfaces are ultrathin planar structures comprised of small cells, which can affect the phase of the incident light in several ways. First, they may introduce a phase delay through the presence of resonant subwavelength nanostructures or nanosized waveguides, effectively altering the propagation speed of the light. The magnitude of this delay is adjustable by fine-tuning the geometry and material composition of the cells. Secondly, by organizing the cells in a deliberate pattern, a phase gradient can be established, leading to a controlled change in the phase of the incident light, which can be harnessed to focus or deflect the wave. Lastly, and particularly relevant to metasurface 14, is the induction of polarization rotation. The cells have the capability to rotate the polarization of the incident light, thereby inducing a subsequent phase shift. Equivalently, each cell may apply a differential phase delay depending on the polarization of the incoming light, thus effectively rotating, or further altering the output polarization compared to the input polarization. This rotation is used in the metasurface 14 in the separation and direction of light into its constituent polarization components for accurate measurement by the photosensor 16. Indeed, as the light interacts with metasurface 14, the metasurface 14 sorts the incident light into its constituent polarization states and directs these onto discrete regions of the photosensor 16. This creates the six distinct polarized images, 16*a*-16*f*, each corresponding to one of the fundamental polarization states of the light as stated.

Figure 2:
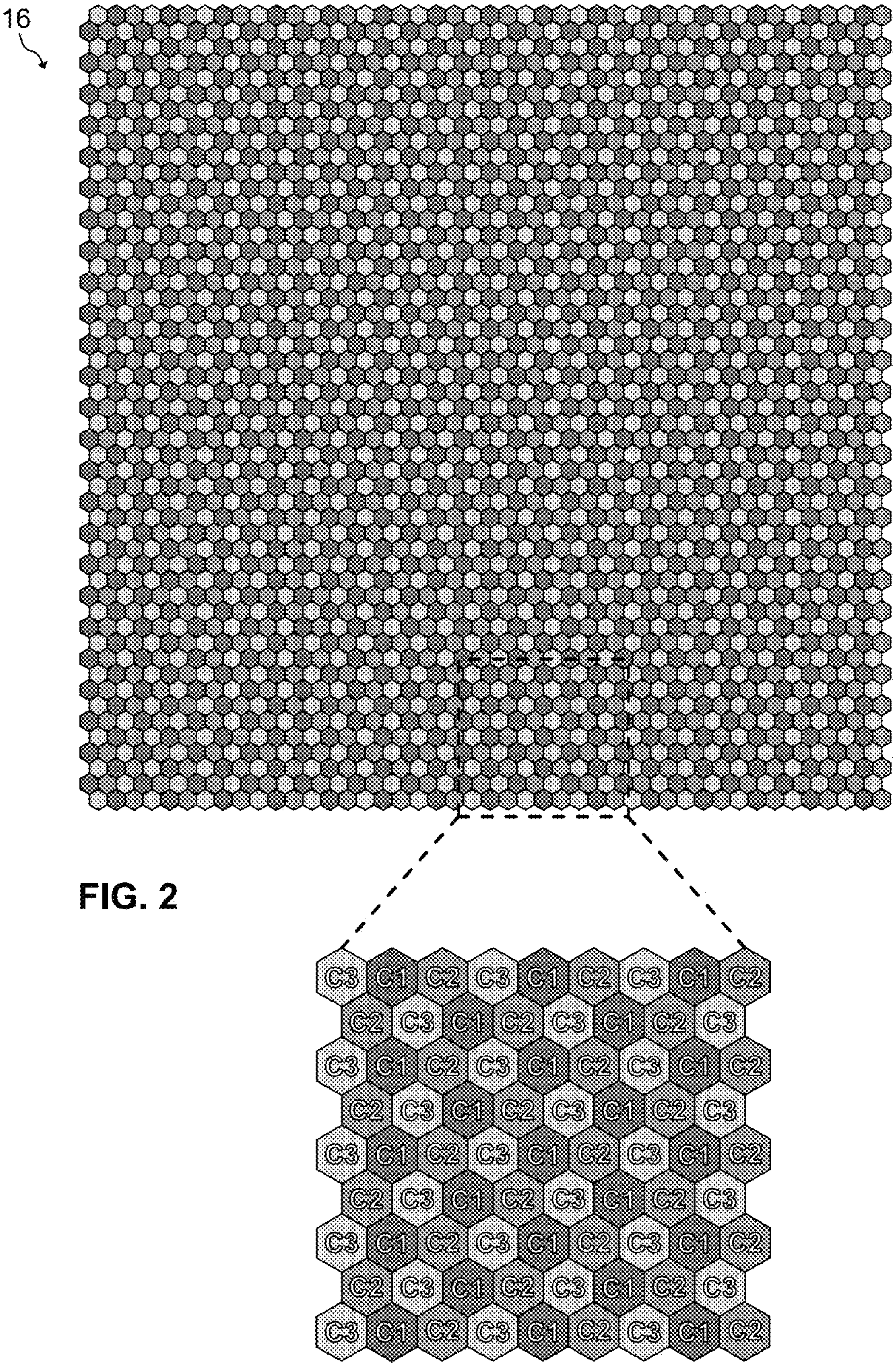
FIG. 2 is a diagrammatical representation of the metasurface of the polarimetric camera of FIG. 1.

As depicted in FIG. 2, the metasurface element 14 is structured as a repeating, interleaved lattice comprised of three distinct types of cells, each functioning analogous to a portion of a lens by focusing specific polarization states onto particular regions 16*a*-16*f* of the sensor 16. The cells labeled C1, formed from anisotropic shaped pillars, are designed to collectively and selectively steer vertically and horizontally polarized light towards a first sensor region 16*c*-16*d*. These cells C1 achieve a directional control that flips the orientation of polarization across the central axis of the sensor 16. Similarly, cells designated as C2 are designed to direct light polarized in the clockwise and counterclockwise directions to a second sensor region 16*a*-16*b*, while C3 cells are designed to direct diagonal and antidiagonal polarized light onto a third sensor region 16*e*-16*f*. This flipping action across the central axis of the sensor 16 provides that each cell of the metasurface element 14 directs its corresponding polarization states to their appropriate locations 16*a*-16*f* on the sensor 16, enabling the polarimetric camera 10 to capture a complete set of polarized images for comprehensive analysis of the Stokes vector at each pixel, as described above.

It must be noted that, while cells C1, C2 and C3 collectively perform projection along their respective polarization axes, cells defined within each sublattice are not identical. Rather, each sublattice C1, C2, C3 is effectively a metasurface element of its own, with part of its clear aperture removed. As should be understood by those of skill in the art, removing portions of the clear aperture of a lens or imaging element does not prevent it from forming an image. Thus, the parallel-imaging functionality of metasurface element 14 may be realized by arranging three independently designed functionalities in interleaved fashion.

The choice of shape, size, and rotation angle of the pillars across the metasurface element 14 may follow the following procedure described hereinafter.

First, three independent optical functions are defined (labelled F1, F2, F3), using for example commonly available optical design software, such that each forms one of images 16*a*, 16*c*, 16*e*, without regard for the input polarization state. This may be performed by defining a corresponding phase function over the clear aperture of the imaging element.

Second, the conjugate phase function for each of the above (F1*, F2*, F3*) is defined, such that the conjugate phase functions generate images of the scene 16*b*, 16*d*, 16*f* for arbitrary input states of light in the same fashion as the above.

Third, separate metasurface elements (M1, M2, M3) are designed to accomplish the projection of incident light onto either F1 or F1*, F2 or F2*, and F3 or F3* depending on the input state of polarization and such that the mapping of polarization state to image section 16*a-f* is realized. This is may be performed by picking metasurface pillar shape, size and angle for each site of the metasurface such that, for example, either function F1 or F1* is realized depending on the incident polarization on element M1 at that site.

Finally, elements M1, M2, M3 are combined by cropping each element in a lattice of cells (C1, C2, C3) such that no two sublattices overlap, and then simply arranging the cells in the corresponding locations on the final metasurface element.

Figure 3:
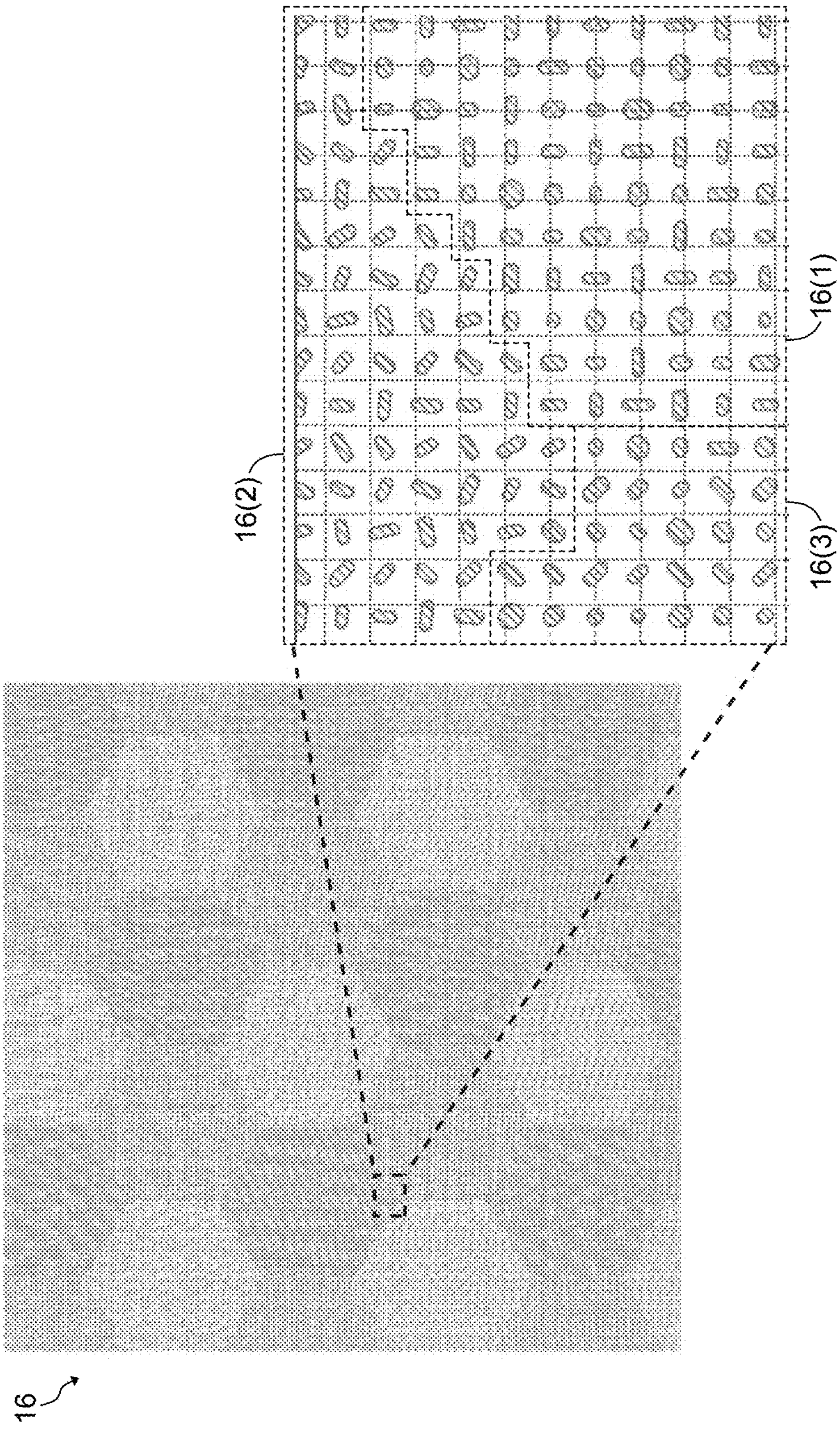
FIG. 3 is a greatly enlarged view of a portion of the metasurface of the polarimetric camera of FIG. 1.

A greatly enlarged view of an intersection of the metasurface 16 where the three distinct types of cells C1, C2, C3 converge is shown in FIG. 3 and now described. In the region labeled as 16(1), a portion of a C1 type cell with horizontally and vertically aligned pillars is shown. These pillars are configured to pass light that is polarized in the vertical and horizontal directions. In the region labeled as 16(2), a portion of a C2 type cell with pillars tilted at a 45-degree angle is shown. These pillars are designed to transmit light with diagonal and antidiagonal polarization. The region labeled as 16(3) includes a portion of a C3 type cell with pillars that are slightly tilted. These pillars are tasked with handling light polarized in the clockwise and counterclockwise directions. The specific pillar orientation of each region 16(1), 16(2), 16(3) serves to filter and direct the polarized light towards specific portions of the sensor 16, facilitating the capture of the six polarized images 16*a*-16*f* as described above.

It must be noted that, while the separation in three sets is required to realize the polarimetric camera 10, it is not necessary that the lattices C1-C3 be lattices of regular cell size and separation, or that the cell size be hexagonal. Indeed, it may be necessary or desirable for a given specific application to implement non-regular interleaved lattice with irregularly sized cells. Such implementation does not alter the essential characteristics of this disclosure, but may present beneficial characteristics, for example in terms of imaging performance or relative light distribution among images 16*a*-16*f*. Similarly, there are no significant restrictions on cell size, except for each field angle the beam passing through stop 12 and impinging on the metasurface element 14 should cover multiple cells and in particular at least in part one of each cell belonging to lattices C1-C3, such that all six images 16*a*-16*f* may be generated for each field angle.

The polarimetric camera 10 has multiple advantages that set it apart from prior art cameras. For example, the design of the polarimetric camera 10 is simple, utilizing an aperture stop 12, a single metasurface element 14, and a sensor 16. Compactness is another advantage, with the thin profile of the metasurface element 14 providing for the polarimetric camera 10 to be more compact than conventional arrangements. Economically, the polarimetric camera 10 is cost-competitive with non-polarizing cameras. This is largely attributable to the cost-effective production of the metasurface element 14, which benefits from the economies of scale inherent in semiconductor fabrication processes. Furthermore, the polarimetric camera 10 is highly functional, capturing the full Stokes vector of light. While 2-Stokes or 3-Stokes cameras are commonly available, the ability to provide full-Stokes imaging, which comprehensively characterizes the polarization state of light, is less common and significantly more valuable for advanced polarimetric analyses. Thus, the polarimetric camera 10 disclosed herein represents a significant step forward, offering a combination of simplicity, compactness, cost-effectiveness, and enhanced functionality.

Compared to existing art relating to polarimetric analysis using metasurfaces, the polarimetric camera 10 has a number of advantages. Namely, it employs a single metasurface element, with no necessity of auxiliary optical elements such as polarizers, wave plates, refractive, diffractive or metasurface imaging lenses, or similar. In addition, the interleaving of lattices C1-C3 as described above ensures an even illumination throughout the field of view, provided the cell sizes are maintained sufficiently small as described above. Relatedly, the field of view is in principle not limited except by usual imaging performance considerations, such as image quality, sensor or imaging element size, and obtainable resolution. Also relatedly, the f/# or aperture size of the imaging system is also not limited except by usual imaging performance considerations.

These advantages render the polarimetric camera 10 useful in a variety of diverse applications. For example, the polarimetric camera 10 may be used in a geoimaging applications, with the polarimetric capabilities enhancing the contrast of features in satellite and aerial imagery, thereby facilitating better analysis of captured imagery. The polarimetric camera 10 may also be used in surveillance applications, in which the polarimetric capabilities may provide for enhanced visibility in certain environmental conditions, improving detection of objects or activities of interest.

In the area of forestry, the polarimetric capabilities of the polarimetric camera 10 may be useful in the assessment of tree health, species identification, and biomass estimation. In the area of oceanography, the polarimetric capabilities of the polarimetric camera 10 may be leveraged in the study of water surface patterns, biological constituents, and underwater features.

In industrial quality control application, the polarimetric capabilities of the polarimetric camera 10 may provide for the capability to detect stresses and defects in workpieces, providing for improved manufacturing precision and product reliability. For example, the polarimetric camera 10 may be utilized in the semiconductor industry for the inspection of wafer surfaces.

Other applications for the polarimetric camera 10 include automotive driver-assistance systems, for example with the polarimetric capabilities improving visibility under diverse weather conditions, such as rain, fog, or glare, enhancing safety and reliability. In biomedical applications, the polarimetric capabilities of the polarimetric camera 10 may provide for the examination of tissue properties, aiding with non-invasive methods for diagnosing diseases, and guiding surgeries by revealing physiological and structural information not visible through conventional imaging.

Furthermore, the polarimetric camera 10 may be utilized in laser beam quality monitoring, as the analysis of the polarization state of laser beams provides useful information for optimizing laser performance for applications in areas such as material processing, communication, and medical treatments. Beyond direct imaging, the polarimetric camera 10 may be utilized for numerous non-imaging applications, such as light pollution measurement, atmospheric studies, and optical component characterization, where the polarimetric capabilities of the polarimetric camera 10 provides insights into the polarization characteristics of light in various environments.

Thus, there is no end to the useful applications that may be found for the polarimetric camera 10 and the devices into which it may be incorporated.

Figure 4:
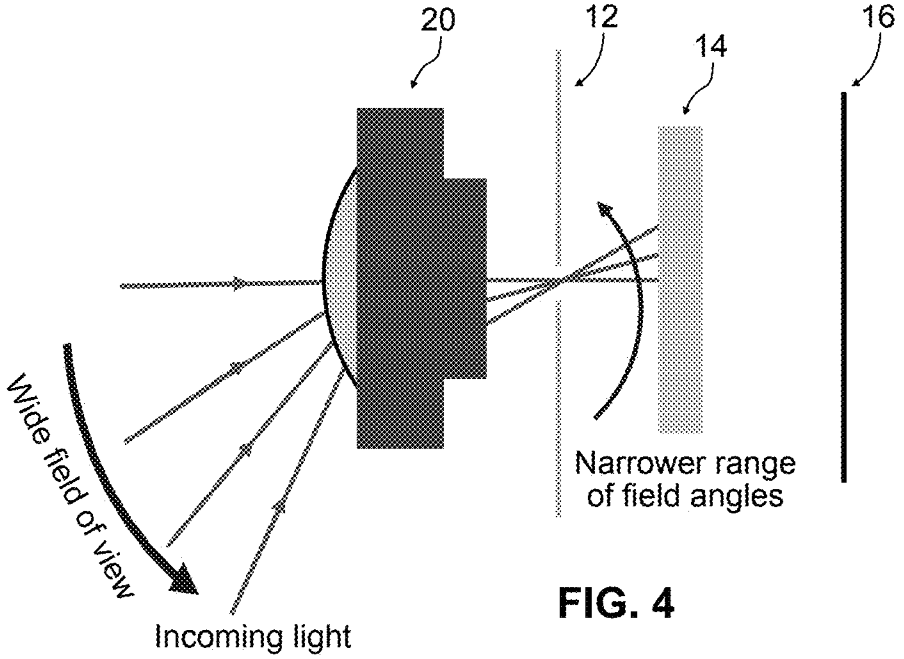
FIG. 4 is a diagrammatical representation of another embodiment of a portion of the polarimetric camera disclosed herein in which an auxiliary lens is utilized upstream of the aperture.

It is evident that modifications and variations can be made to what has been described and illustrated herein without departing from the scope of this disclosure. For instance, as shown in FIG. 4, an auxiliary refractive lens 20 can be positioned so that incoming light from a wide field of view enters through an auxiliary refractive lens 20 before passing through the aperture 12 to impinge upon the metasurface 14.

Figure 5:
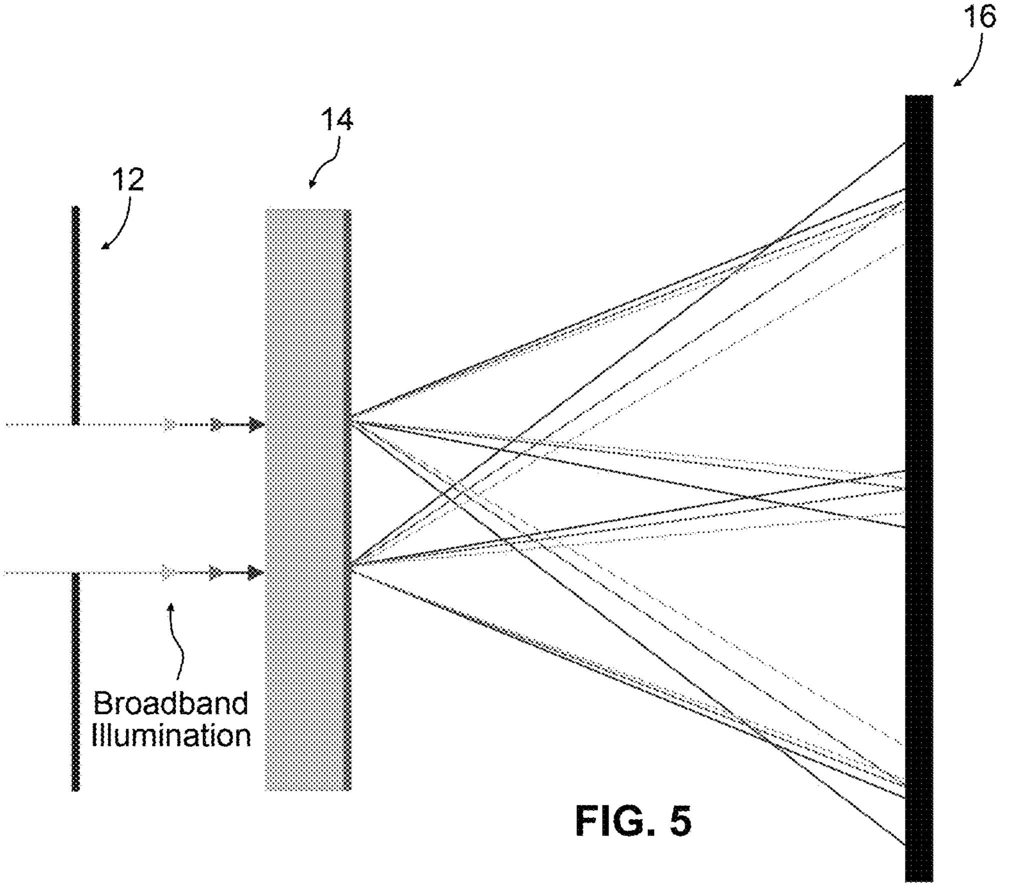
FIG. 5 is a diagrammatical representation of a portion of the polarimetric camera disclosed herein, illustrating the effect of broadband illumination when using a metasurface that is not dispersion-compensated.
Figure 6:
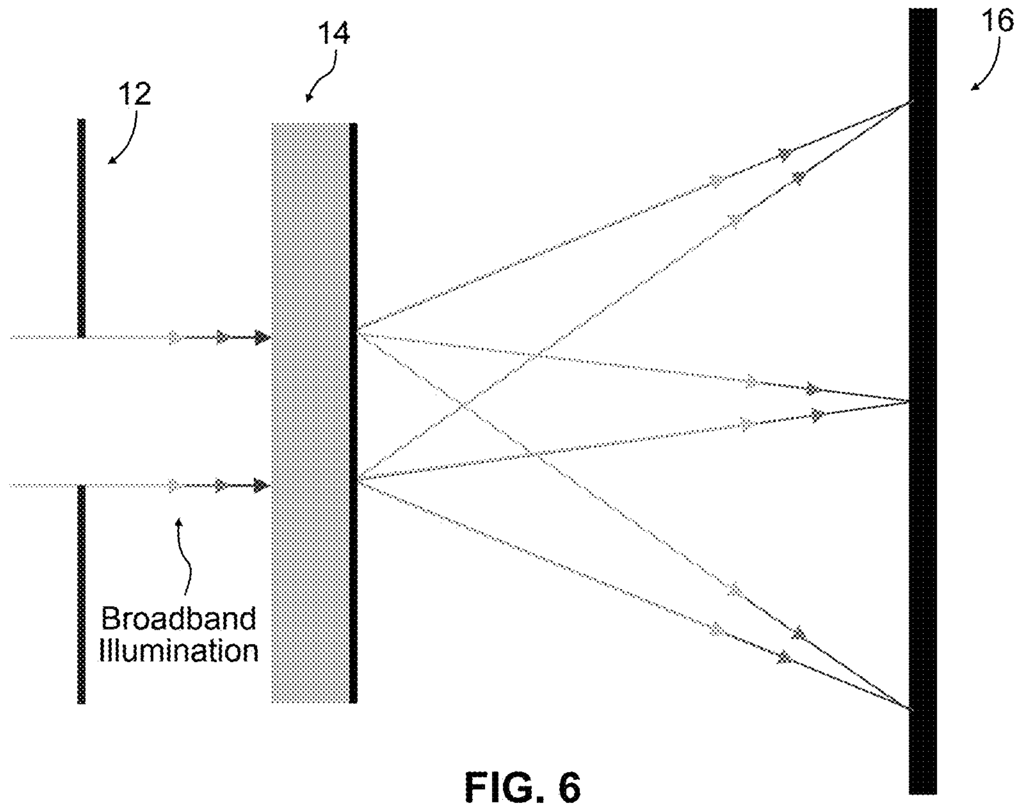
FIG. 6 is a diagrammatical representation of a portion of the polarimetric camera disclosed herein, illustrating the effect of broadband illumination when using a metasurface that is dispersion-compensated.

As another example, the metasurface may be a dispersion-compensated metasurface. As shown in the example of FIG. 5, if a non dispersion-compensated metasurface 14 is illuminated with broadband illumination, light at wavelengths significantly different from the intended design wavelength suffer from chromatic aberration resulting in low contrast, low resolution images, and incorrect image sizes. However, as shown in the example of FIG. 6, if a dispersion-compensated metasurface 14 is utilized, the operational bandwidth can be extended, allowing it to function effectively across a wider spectrum of light frequencies. Note that to form the dispersion-compensated metasurface 14, the pillar shapes and sizes forming the metasurface are chosen so that optical function (crucially, including any polarization-tuned function) remains the same across a broad range of wavelengths, thus achieving good (polarization) imaging across the illumination range.

Figure 7:
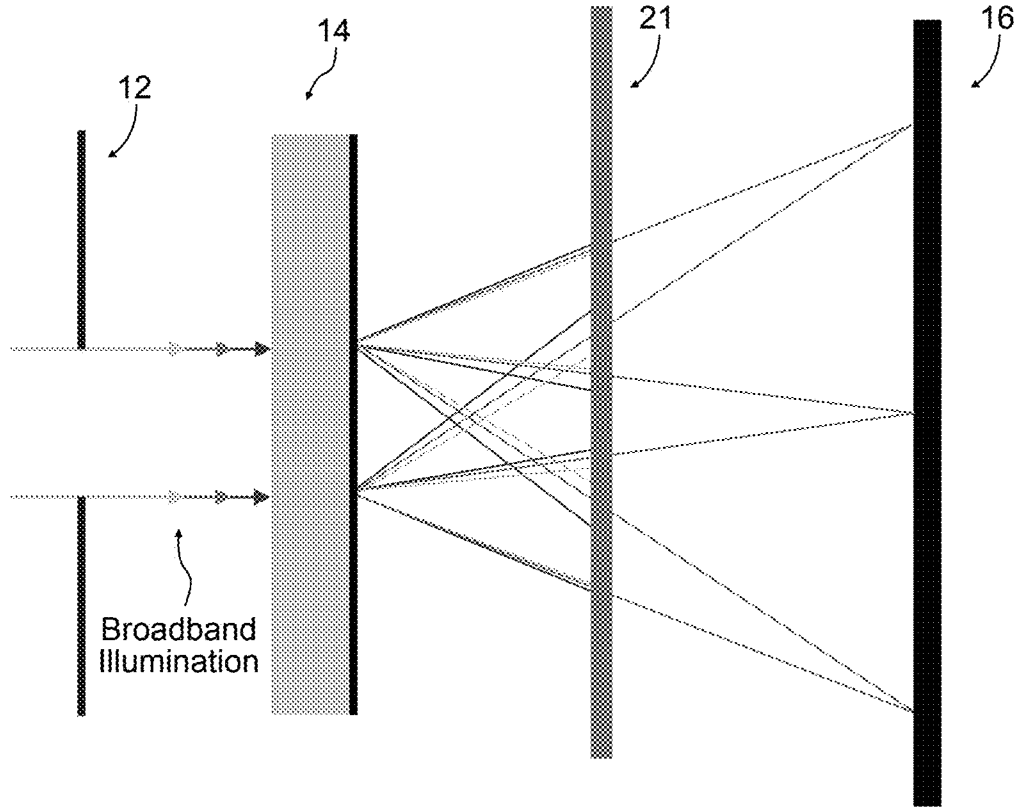
FIG. 7 is a diagrammatical representation of another embodiment of a portion of the polarimetric camera disclosed herein in which a bandpass filter is located between the metasurface and optical sensor.

As shown in FIG. 7, the integration of a bandpass filter 21, either preceding or succeeding the aperture stop 12, would facilitate passive imaging capabilities, enabling the polarimetric camera 10 to utilize ambient light for image capture.

There are also various possibilities for arranging the polarization-splitting cells; an alternative approach could involve a rectangular, Bayer-like pattern, optimizing the sampling for specific polarization states to provide priority to certain vectors in the Stokes parameters. Another variation could be the metasurface 14 being arranged to generate four polarized images instead of six. This could potentially reduce distortion and expand the field of view while still capturing the complete Stokes information, thus balancing functionality with image quality. Moreover, if combined with an external imaging lens, the polarimetric camera 10 could be tailored to encompass an extensive field of view. Such an adaptation might further reduce the use of postprocessing correction and enhance the overall imaging quality.

Also note that instead of an ASIC 18, any suitable digital processor may be used, and that the image sensor 16 may be any form of image sensor, such as a CCD or CMOS array.

Above, usage of a polarimetric camera to generate an undistorted representation of the captured scene as a final output image has been described, with each pixel in the final output image embodying a Stokes vector. However, the polarimetric camera can also be used to reconstruct a 3D image of the capture scene.

To reconstruct a 3D image of a scene from full polarization maps, where each pixel's light is characterized by a Stokes vector, a post-processing algorithm may be employed to analyze the light's polarization state to determine a depth map for the scene, as well as surface orientations and material properties of objects in the scene. This post-processing algorithm may utilize the relationship between the local normal to an object's surface and the degree of specular and diffuse polarization, allowing for the estimation of surface normals and the extraction of geometric details utilized to reproduce a 3D image of the scene. By analyzing how polarization states vary with the angle between the camera sensor and different parts of the scene, the algorithm can therefore infer object distances from the camera. Further details of the performance of a reconstruction of a 3D image from a scene from a full polarization map may be found in references [1], [2], [3], [4], [5], and [6], all of which are incorporated by reference in their entirety.

Figure 8:
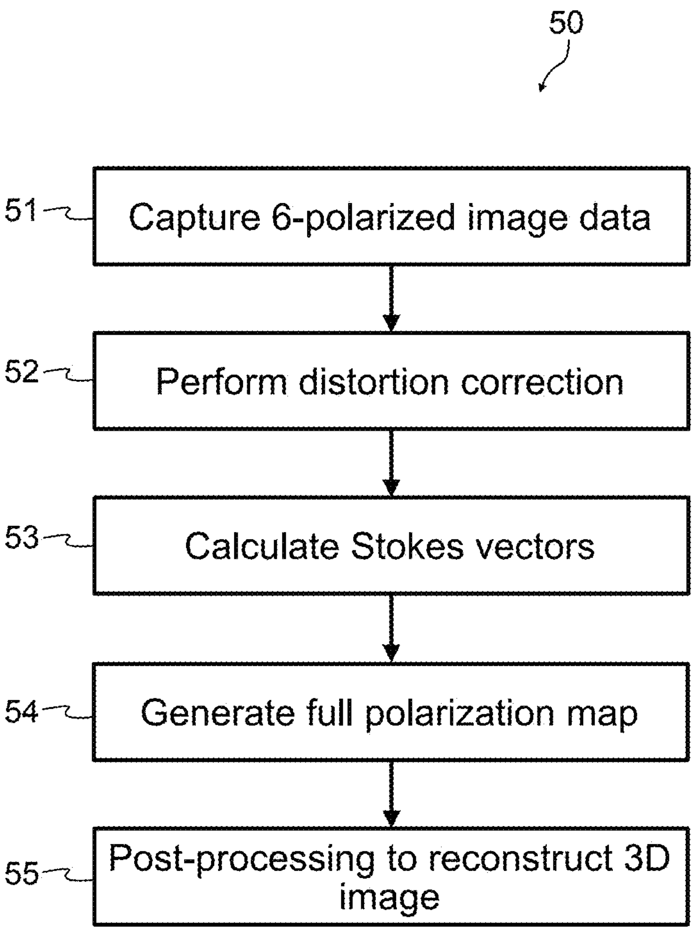
FIG. 8 is a flowchart of a method of operating the polarimetric camera of FIG. 1 to perform 3D image reconstruction.

Shown in FIG. 8 is a full workflow for the generation of the full polarization map of the captured scene and the reconstructed 3D image of the scene. First, a metasurface is utilized to split the incoming light into multiple polarized images of the scene, which are captured by a photosensor (Block 51), as described above. Then, distortion correction is performed by an ASIC (Block 52), as described above. Next, the polarized images are processed by the ASIC by mapping pixels from each of the polarized images to corresponding counterparts in others of the polarized images, and a full Stokes vector for each pixel is reconstructed (Block 53), as described above. From this, a final output image representing a full polarization map is generated by the ASIC (Block 54), with each pixel in the final output image embodying a Stokes vector, as described above. The post-processing is then performed by the ASIC to reconstruct a 3D image of the scene represented by the final output image (Block 55), as described above. The 3D image of the scene produced is high resolution, accurate over a variety of properties of the objects in the scene, and accurate over a long distance between the camera and objects in the scene, thus rendering the polarimetric camera particularly useful and valuable for 3D imaging applications.

[1] Sansoni et al. 2009, *State-of-The-Art and Applications of 3D Imaging Sensors in Industry, Cultural Heritage, Medicine, and Criminal Investigation*. DOI:/10.3390/s90100568

[2] Li et al. 2023, *Polarization 3D imaging technology: a review*. DOI: 10.3389/fphy.2023.1198457

[3] Bargo et al. 2010, *Measurement of skin texture through polarization imaging*. 10.1111/j.1365-2133.2010.09639.x

[4] Miyazaki et al. 2002, *Determining surface orientations of transparent objects based on polarization degrees in visible and infrared wavelengths*. DOI: 10.1364/JOSAA.19.000687

[5] Atkinson et al. 2006, *Recovery of Surface Orientation From Diffuse Polarization*. DOI: 10.1109/TIP.2006.871114

[6] Li et al. 2021, *Near-infrared monocular 3d computational polarization imaging of surfaces exhibiting non-uniform reflectance*. DOI: 10.1364/OE.423790

Although this disclosure has been described with a limited number of embodiments, those skilled in the art, having the benefit of this disclosure, can envision other embodiments that do not deviate from the disclosed scope. Furthermore, skilled persons can envision embodiments that represent various combinations of the embodiments disclosed herein made in various ways.

The invention claimed is:

1. A polarimetric camera, comprising:

an aperture stop configured to permit entry of incoming light from a scene;

a single photosensor array arranged to capture images; and a metasurface element positioned between the aperture stop and the single photosensor array, wherein the metasurface element includes first, second, and third sets of cells arranged in an interleaved pattern such that cells from each set are interspersed with one another throughout the metasurface element, the first, second, and third sets of cells designed to split the incoming light into multiple polarized images, each polarized image corresponding to a distinct fundamental polarization state.

2. The polarimetric camera of claim 1, wherein the first set of cells is configured to separate the incoming light into vertically and horizontally polarized light;

wherein the second set of cells is configured to separate the incoming light into clockwise and counterclockwise polarized light; and wherein the third set of cells is configured to separate the incoming light into diagonally and antidiagonally polarized light.

3. The polarimetric camera of claim 1, wherein the first, second, and third sets of cells are configured to separate the incoming light into three distinct pairs of polarization states of light, such that within each pair the polarization states are mutually orthogonal.

4. The polarimetric camera of claim 1, wherein the first, second, and third sets of cells are arranged in a hexagonally interleaved pattern.

5. The polarimetric camera of claim 1, wherein the first, second, and third sets of cells are arranged in an irregularly interleaved pattern.

6. The polarimetric camera of claim 1, wherein the interleaved pattern is configured to project the multiple polarized images onto corresponding regions of the single photosensor array; and further comprising circuitry configured to reconstruct a full Stokes vector for each pixel of the captured images.

7. The polarimetric camera of claim 1, wherein the first, second, and third sets of cells are configured to flip orientation of polarization across a central axis of the metasurface element so that the first set of cells separates the incoming light into vertically and horizontally polarized light, so that the second set of cells separates the incoming light into clockwise and counterclockwise polarized light, and so that the third set of cells separates the incoming light into diagonally and antidiagonally polarized light.

8. The polarimetric camera of claim 1, wherein the first, second, and third sets of cells are configured to flip orientation of polarization across a central axis of the metasurface element so that the first set of cells separates the incoming light into a first orthogonal pair of light polarization states, so that the second set of cells separates the incoming light into a second orthogonal pair of light polarization states, and so that the third set of cells separates the incoming light into a third orthogonal pair of light polarization states.

9. The polarimetric camera of claim 1, further comprising a processing circuit configured to process the captured images by mapping pixels from each of the multiple polarized images to corresponding counterparts in others of the multiple polarized images, and then reconstructing a full Stokes vector for each pixel of the captured images from the multiple polarized images.

10. The polarimetric camera of claim 9, wherein the processing circuit is further configured to correct fixed distortion resulting from the aperture stop, thereby producing an undistorted final output image.

11. The polarimetric camera of claim 10, wherein the processing circuit is further configured to reconstruct a three dimensional image of the scene from the full Stokes vector for each pixel of the captured images.

12. A method for capturing polarized images using a polarimetric camera, the method comprising:

permitting entry of incoming light through an aperture stop;

directing the incoming light onto a metasurface element positioned between the aperture stop and a single photosensor;

splitting the incoming light into multiple polarized images using first, second, and third sets of cells arranged in an interleaved pattern such that cells from each set are interspersed with one another throughout the metasurface element, wherein each polarized image corresponds to a distinct fundamental polarization state; and capturing the multiple polarized images using the single photosensor.

13. The method of claim 12, wherein splitting the incoming light includes manipulating phase and amplitude of the incoming light via subwavelength nanostructures of the cells in the metasurface element to produce images corresponding to vertical-horizontal polarization, clockwise-counterclockwise polarization, and diagonal-antidiagonal polarization.

14. The method of claim 12, wherein splitting the incoming light includes manipulating phase and amplitude of the incoming light via subwavelength nanostructures of the cells in the metasurface element to produce images corresponding to three distinct polarization pairs.

15. The method of claim 12, wherein the incoming light is split into:

vertically and horizontally polarized light using the first set of cells;

clockwise and counterclockwise polarized light using the second set of cells; and diagonally and antidiagonally polarized light using the third set of cells.

16. The method of claim 15, wherein the first, second, and third sets of cells are arranged in a hexagonally interleaved pattern within the metasurface element.

17. The method of claim 15, wherein the first, second, and third sets of cells are arranged in an irregularly interleaved pattern within the metasurface element.

18. The method of claim 15, wherein orientation of the polarization is flipped across a central axis of the metasurface element by each of the first, second, and third sets of cells.

19. The method of claim 12, wherein the interleaved arrangement of cells is configured to project the multiple polarized images onto corresponding regions of the photosensor, and further comprising reconstructing a full Stokes vector for each pixel of the captured images.

20. A metasurface element, comprising:

first, second, and third sets of cells arranged in an interleaved pattern such that cells from each set are interspersed with one another throughout the metasurface element;

wherein the first set of cells is configured to separate incoming light from a scene into vertically and horizontally polarized light;

wherein the second set of cells is configured to separate the incoming light into clockwise and counterclockwise polarized light; and wherein the third set of cells is configured to separate the incoming light into diagonally and antidiagonally polarized light.

21. A camera apparatus including the metasurface element of claim 20, the camera apparatus further comprising:

a photosensor array arranged with respect to the metasurface element so that the vertically and horizontally polarized light is projected onto corresponding first and second regions of the photosensor array, the clockwise and counterclockwise polarized light is projected onto corresponding third and fourth regions of the photosensor array, and the diagonally and antidiagonally polarized light is projected onto corresponding fifth and sixth regions of the photosensor array, such that the photosensor array captures a single image comprised of first, second, third, fourth, fifth, and sixth sub-images at the corresponding first, second, third, fourth, fifth, and sixth regions of the photosensor array; and an application specific integrated circuit (ASIC) configured to compare relative intensity of different pixels of the single image by mapping pixels from each of the first, second, third, fourth, fifth, and sixth sub-images to their corresponding counterparts in others of the first, second, third, fourth, fifth, and sixth sub-images to thereby reconstruct a full Stokes vector for each pixel of the single image.

22. The camera apparatus of claim 21, wherein the ASIC is further configured to reconstruct a three dimensional image of the scene from the full Stokes vector for each pixel of the single image.

* * * * *